(No Model.)

W. McAUSLAND.
FRUIT HOLDER.

No. 524,645. Patented Aug. 14, 1894.

WITNESSES:
Fred G. Dieterich
Edw. W. Byrn

INVENTOR
William McAusland.
BY Munn & Co
ATTORNEYS.

THE NORRIS PETERS CO., PHOTO-LITHO., WASHINGTON, D. C.

UNITED STATES PATENT OFFICE.

WILLIAM McAUSLAND, OF TAUNTON, MASSACHUSETTS, ASSIGNOR TO THE REED & BARTON CORPORATION, OF SAME PLACE.

FRUIT-HOLDER.

SPECIFICATION forming part of Letters Patent No. 524,645, dated August 14, 1894.

Application filed March 30, 1894. Serial No. 505,711. (No model.)

*To all whom it may concern:*

Be it known that I, WILLIAM MCAUSLAND, of Taunton, in the county of Bristol and State of Massachusetts, have invented a new and useful Improvement in Fruit-Holders, of which the following is a specification.

My invention relates to that class of fruit holders for the table which are designed to hold a single orange, or other similar piece of fruit, to facilitate the eating of the same with a spoon and to render the act more cleanly, convenient and dainty. It relates more directly to that form of orange holder in which a cup is mounted upon a suitable base and is provided with spurs or prongs which engage with and hold the half of an orange while being acted upon by the spoon.

It consists of the peculiar construction and arrangement of device for locking and holding the orange in the cup in such a manner as to permit the cup and locking device to be readily cleaned, and also in the special construction of the base of the cup whereby the device may be tilted to accommodate it to convenient and graceful position on the table when in use, and also to permit it to be rotated pivotally on its said base, the latter being also made available as a receptacle for seed and any drip of juice.

Figure 1:
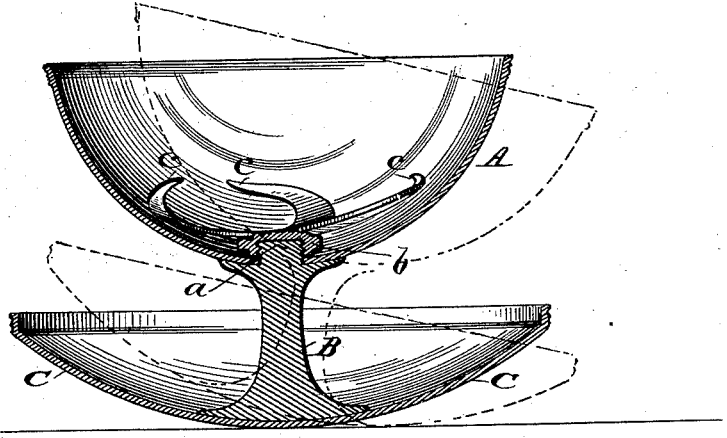
Figure 2:
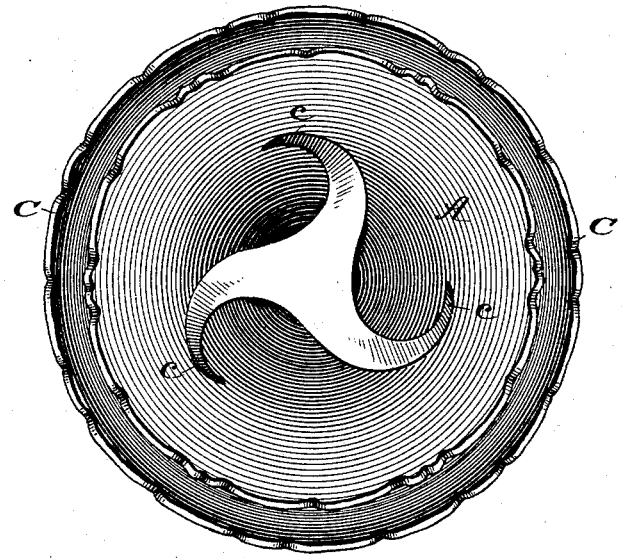

Figure 1 is a vertical central section and Fig. 2 is a plan view.

In the drawings A represents the cup which is designed to form the receptacle for the fruit. This is mounted upon a stem B which at its bottom is provided with a base C, all of which parts are preferably made of metal, silver plated or solid, and are rigidly connected together.

In the bottom of the cup there projects slightly a short screw stem *a* adapted to receive a plate which has a screw threaded socket *b* in its under side adapted to fit the stem *a*, and three, more or less, sharp prongs or spurs *c c c* which are curved in the same direction, and rise slightly as they taper to sharp points, the curve of the prongs being such that the prongs point rearwardly in screwing the plate on to the stem *a*. This is for the purpose of causing the prongs to point in such direction that when turning the orange on to the prongs, to embed them, this act will not unscrew or loosen the plate bearing said prongs.

When the orange, or other fruit, is to be secured within the holder, the fruit is usually bisected crosswise its cells, and the half is then turned hard against the prongs with the cut side uppermost. This act causes the three prongs to enter the tough skin of the orange and hold it securely while the spoon is being manipulated in its cells. The screw connection of the prong plate permit the latter to be readily removed and the parts to be quickly, thoroughly, and conveniently cleaned when its service at the table is concluded.

The base of the holder is made without a flat bottom, and is a perfectly smooth convex face forming a dish or saucer shaped receptacle on the upper side. This has a three fold value. In the first place it permits the vessel to be twirled around pivotally on the table, to bring the cells of the orange successively into range of convenient reach by the spoon. Secondly, it permits the whole device to be tipped or canted to one side, as shown by dotted lines, to permit the cells of the fruit to be more readily reached by the spoon in the right hand without awkwardly raising the elbow, and thirdly, a drip cup for juice and receptacle for seed is also formed that greatly promotes the delicate and cleanly dispatch of this course at the table.

The location of the prong plate in the bottom of the cup and its particular form, also adapt the holder to either large or small oranges equally well, holding both with equal certainty and firmness.

Although it is intended for the most part to make these fruit holders of silver ware, it will be readily understood that they may be made of glass, the screw stem *a* being in such case blown or pressed to receive the socket of the metal prong plate.

If desired the metal prong plate may be a fixture in the bottom of the cup.

I am aware that an orange holder has heretofore been constructed comprising a cup shaped receptacle adapted to receive an orange, and a suitable base or support therefor, said receptacle being provided with means substantially as described projecting inwardly from the body thereof, for piercing the skin of the orange to prevent rotation thereof within the holder in one direction. This broad idea I disclaim as not being of my invention.

Having thus described my invention, what I claim as new, and desire to secure by Letters Patent, is—

1. A fruit holder consisting of a cup provided with a suitable base, and having inside of said cup at its bottom a concentric prong plate having prongs curved rearwardly with reference to the direction in which the plate is screwed on substantially as and for the purpose described.

2. A fruit holder having in its bottom a centrally arranged plate with diverging and pointed prongs substantially as shown and described.

3. A fruit holder having a base whose under side is smooth and convex to permit pivotal action, and the tilting of the holder, substantially as shown and described.

WILLIAM McAUSLAND.

Witnesses:
GEO. E. CHAMBERS,
THEO. P. HALL.